(12) United States Patent
Iourcha et al.

(10) Patent No.: US 7,903,118 B2
(45) Date of Patent: Mar. 8, 2011

(54) METHODS FOR ALLOCATING INFORMATION TO SYSTEM RESOURCES USING IMPROVED MAPPING

(75) Inventors: Konstantine Iourcha, San Jose, CA (US); Gordon Elder, Los Altos, CA (US); Elaine Poon, San Jose, CA (US)

(73) Assignee: AMD Inc., Sunnyvale, CA (US)

( * ) Notice: Subject to any disclaimer, the term of this patent is extended or adjusted under 35 U.S.C. 154(b) by 677 days.

(21) Appl. No.: 11/273,915

(22) Filed: Nov. 14, 2005

(65) Prior Publication Data
US 2006/0139357 A1    Jun. 29, 2006

Related U.S. Application Data

(60) Provisional application No. 60/627,675, filed on Nov. 12, 2004.

(51) Int. Cl.
*G06F 15/00* (2006.01)
*G06T 1/00* (2006.01)
*G06T 1/60* (2006.01)

(52) U.S. Cl. .......................... 345/501; 345/530

(58) Field of Classification Search ................. 345/501, 345/568, 571; 718/104
See application file for complete search history.

(56) References Cited

U.S. PATENT DOCUMENTS

| | | | | |
|---|---|---|---|---|
| 6,604,166 B1 * | 8/2003 | Jana et al. | | 711/5 |
| 6,667,745 B1 * | 12/2003 | Hussain | | 345/545 |
| 6,934,422 B2 * | 8/2005 | Hamza | | 382/293 |
| 2006/0050074 A1 * | 3/2006 | Bassi | | 345/427 |

\* cited by examiner

*Primary Examiner* — Kee M Tung
*Assistant Examiner* — Jacinta Crawford
(74) *Attorney, Agent, or Firm* — Courtney IP Law

(57) ABSTRACT

Embodiments described herein provide a programmable mapping scheme for mapping information to resources of a system. In an embodiment, a programmable lattice method operates to map information to resources of a system. For example, the programmable lattice method can be used to map pixel data to graphics processing resources of a graphics processing system. In another embodiment, a programmable hybrid method operates to map information to resources of a system. For example, the programmable hybrid method can be used to map pixel data to graphics processing resources of a graphics processing system. The mapping methods described are applicable to any multi-dimensional array processing (e.g., 2D and 3D). The methods provide a uniform distribution of resources and tend to reduce resource collisions when allocating information to a resource.

25 Claims, 2 Drawing Sheets

FIG.1
(PRIOR ART)
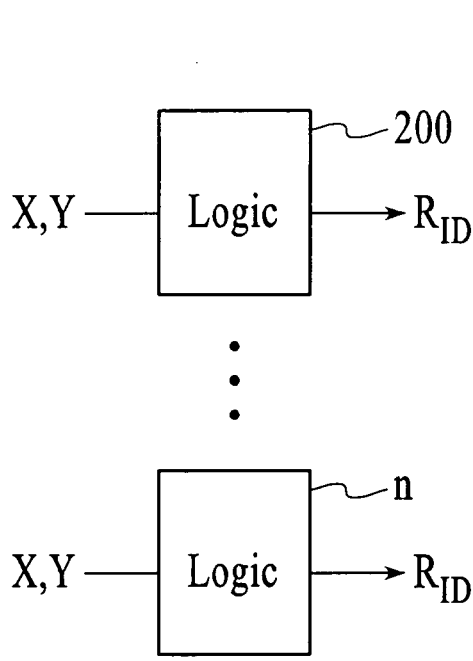
FIG.2A
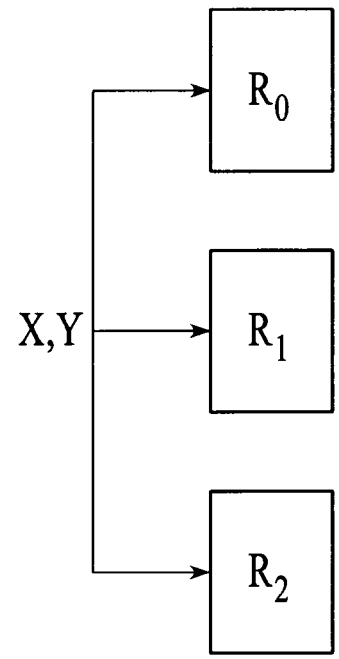
FIG.2B

```
220011220011          001122001122
220011220011          001122001122
112200112200          122001122001
112200112200          122001122001
001122001122          001122001122
001122001122          001122001122
```

… (Detailed description follows)

METHODS FOR ALLOCATING INFORMATION TO SYSTEM RESOURCES USING IMPROVED MAPPING

RELATED APPLICATIONS

This application claims the benefit of U.S. Provisional Application No. 60/627,675 filed on Nov. 12, 2004, entitled "Improved Mapping Schemes for Resource Allocation".

BACKGROUND OF THE DISCLOSURE

During computer rendering, a digitized image and/or image related information (for instance depth information, Z) is usually represented as a two-dimensional (2D) array of values, one for each of [x, y], where [x, y] are coordinates of the image surface. The rendering process renders primitives (e.g., triangles) in different areas of an image. A rendering device, such as a processor, can include multiple instances of similar classes of resources, such as processing pipes, cache line, memory channels, etc. required for the rendering process. Each of the classes of resources, such as those enumerated above, can include multiple similar items each assigned a unique device identification (ID) to differentiate it from similar devices. Optimally, as many resources as possible are used simultaneously.

Direct mapping can be used, either to simplify the implementations (such as with caches) or because a resource cannot be easily reallocated during the processing time. For example, a resource may not be readily reallocated during the processing time because of pixel locations values in an external memory. In this case, each item of a resource, identified by its unique device ID, is allocated to some set of pixels defined by a set of {[x, y]} coordinates. This allocation defines a mapping from [x, y] to the set of the resource items. Different pixels generally share the same resource which can tend to exacerbate the problem of an effective reallocation of resources.

It is difficult to achieve a uniform mapping of resources using conventional mapping techniques that rely solely on dyadic permutations. A 2D rendering can be especially difficult when using resource items that include numbers of resource items that are not powers of two. Moreover, if a resource item in turn consists of the several items of a different resource, (say, a memory channel has several banks), then the optimal mapping for both type of the resource is even more difficult to achieve. The conventional mappings tend to be inflexible and difficult to implement it in a programmable/parameterized way.

For efficient rendering, it is also preferred to maximize resource utilization. This typically infers that at any given time interval, most of the resource items are in use. Also, as the rendering process has some locality properties in [x, y], the same resource item should not be mapped to too many pixels in a small neighborhood, which can result in collisions during resource requests. FIG. 1 is a diagram illustrating poor resource mapping for three resources with device or resource IDs 0, 1, and 2. Hence, there exists a problem of efficiently allocating instances of similar resources, for example to particular pixels identified by their coordinates [x, y].

BRIEF DESCRIPTION OF THE DRAWINGS

FIG. 1 is a diagram illustrating prior art poor resource mapping for three resources.

FIG. 2A is a block diagram illustrating a mapping of information to a number of resources.

FIG. 2B is a block diagram which illustrates a number of resources receiving pixel data based on mapping logic.

DETAILED DESCRIPTION

Figures 3, 4A, 4B:
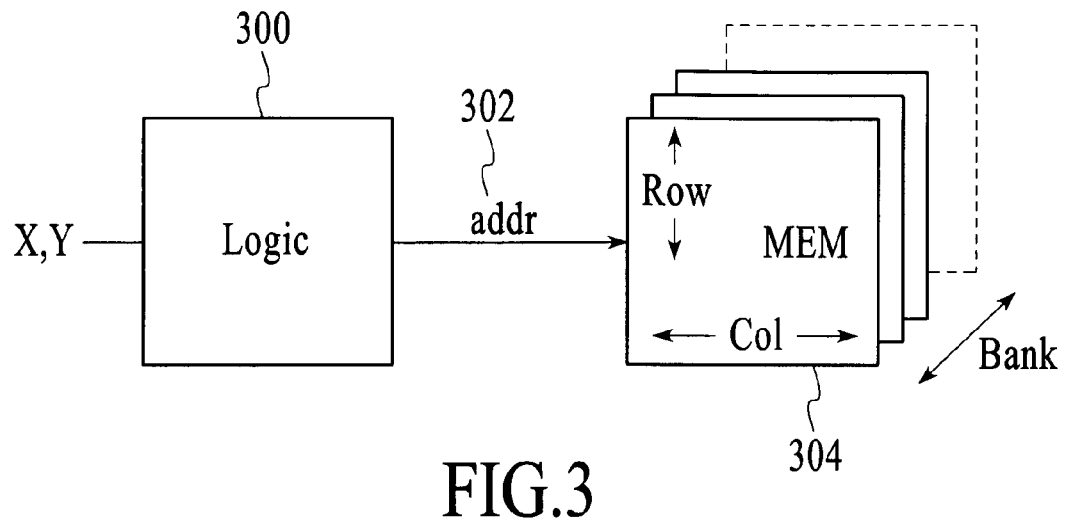
FIG. 3 is a block diagram illustrating a mapping of information to a number of resources.
FIG. 4A illustrates a resultant mapping using lattice mapping logic, according to an embodiment.
FIG. 4B illustrates a resultant mapping using lattice mapping logic, according to an embodiment.

Embodiments described herein provide a programmable mapping scheme for mapping information to resources of a system. In an embodiment, a programmable lattice method operates to map information to resources of a system. For example, the programmable lattice method can be used to map pixel data to graphics processing resources of a graphics processing system. In another embodiment, a programmable hybrid method operates to map information to resources of a system. For example, the programmable hybrid method can be used to map pixel data to graphics processing resources of a graphics processing system. The mapping methods described are applicable to any multi-dimensional array processing (e.g., 2D and 3D). The methods provide a uniform distribution of resources and tend to reduce resource collisions when allocating information to a resource.

While the description below refers to elements of graphics processing, such as pixels, the mapping methods are not limited to the field of graphics processing. In general however, the examples given for the purpose of illustration herein are particularly adapted to mapping pixels to processing pipes, mapping pixels to cache lines of direct mapped caches, and mapping pixels to memory channels, memory banks and/or memory rows.

FIG. 2A is a block diagram illustrating a mapping of information to a number of resources. For example, as shown in FIG. 2A, pixel data, in the form of x and y coordinates, is input into logic module 200. Likewise, pixel data, in the form of x and y coordinates, is input into logic module n. As described below, each logic module 200-n includes mapping logic which operates to map the pixel data to resources of a system, such as a graphics processing unit (GPU). For example, the mapping logic operates to map pixel data to processing pipes, cache lines, etc. of a graphics processing system. The mapping logic can be implemented in a GPU, a general purpose processor, an integrated chipset product or computer system or the like.

FIG. 2B is a block diagram which illustrates a number of resources receiving pixel data based on the mapping logic of logic modules 200-n. That is, resources 0, 1, and 2 receive pixel data after the mapping logic of each logic module 200-n has mapped the pixel data to a respective resource of the system. Each logic module 200-n accepts the two-dimensional coordinate data and generates a resource ID, and maps pixel data to the respective resource based on the mapping logic of each logic module 200-n. The logic modules 200-n can include different mapping logic according to a desired implementation. Various mapping logic implementations are described below.

FIG. 3 is a block diagram illustrating a mapping of information to a number of resources. As shown in FIG. 3, mapping logic of logic module 300 receives pixel data in the form of x and y coordinates. The mapping logic of logic module 300 operates to map the pixel data to memory addresses 302 of a number of memory banks 304-n. In this case, logic receives pixel coordinate data and generates a row, column, and bank address for storage of pixel data, such as color values for example.

According to an embodiment, mapping logic of a logic module operates on information, such as pixel data, to map the information to a number of system resources. For this embodiment, the mapping logic is referred to as lattice mapping logic. A device can include the lattice mapping logic which operates on information and maps the information to a number of system resources. The lattice mapping logic is defined as follows:

First, let v1, v2 be two vectors (integer vectors, for example) in [X,Y] which are coordinates of an image surface for example. The set of all integer combinations of n1*v1+ n2*v2 is defined as a "lattice". Now, let T be some (usually 4-connected, but not necessarily) set in [X, Y], such that the (discreet) [X,Y] plane can be tiled with the translations of T. T can be rectangle, but is not so limited. Let T have some reference point (for example a corner, center, etc.). Now the set of all of these points of the above tilings can be considered.

As an example, the lattice mapping logic operates to map pixel data to a resource as follows:

First, consider an item of a resource. Using the lattice mapping logic, the resource mapping is such, that:
  a. all pixels of each tile (congruent to T) of the above tiling are mapped to the same resource item;
  b. all reference points of the tiles mapped to the same resource item form a translated lattice with some basis vectors v1 and v2; and
  c. the lattice basis vectors are the same for all resource items.

According to an embodiment, mapping logic operates to provide a subclass of lattice mappings, as described below:
  a. First, assume that T is a rectangle, with sides m and n being a power of two, (i.e. $2^n \times 2^m$);
  b. Let M be an integer 2×2 matrix; and
  c. Let k and l integers such that k*l is the number of the resource items.
    Then the mapping of pixel data,
    (x, y)–>R (where R is the set of resource IDs "r"), includes:
    [x',y']=M*[x >>n,y>>m], where x and y are vectors;
    x>>n=(x/$2^n$) and y>>m=(y/$2^m$);
    r=(x'mod k)*l+(y'mod l).

Thus, a subclass of a lattice mapping is shown.

The subclass of a lattice mapping as described above is for illustration and it does not implement or limit other lattice mappings. Extensions to hybrid mapping are also contemplated. Extensions to mapping which can switch between dyadic permutation group based, lattice and/or hybrid mappings are also contemplated.

Additional extensions (e.g., to have full row mapping) can be specified. By making M, k, l, n, m programmable, different lattices can be realized. That is, a device includes various inputs, including M, k, l, n, m, which can be programmed according to a desired resource mapping implementation.

According to an embodiment, mapping logic of a logic module operates on information, such as pixel data, to map the information to a number of system resources. For this embodiment, the mapping logic is referred to hybrid mapping logic. A device can include programmable hybrid mapping logic which operates on information and maps the information to a number of system resources. The hybrid mapping logic is defined as follows:

First, a number of resource items are combined into sets with a number of elements of power of 2.
  Then:
  a. Sets (as a resource) are mapped with a lattice mapping using the lattice mapping logic described above. That is, different resource items are mapped with different lattices. The sets are mapped such that a full set is used to process a translated tile T (where T is rectangle for example);
  b. Items of the set are further mapped to aspects of T using a standard dyadic permutation approach; and/or
  c. OPTIONALLY, the lattice basis vectors are the not the same for all resource items. That is, different lattices map to different resource items and/or resources.

The following examples illustrate the use of a device having lattice mapping logic to map pixel data to a number of resources. For this example, the lattice mapping logic allocates or maps the pixel data to three pixel pipes. FIGS. 4A and 4B illustrate a resultant mapping using lattice mapping logic described above. For these examples one digit represents one quarter of one 16×16 tile in [X,Y] mapped to a processing pipe with the corresponding device ID 0, 1, or 2.

The pipe resource mapping in FIG. 4A flows from the following equation:

$$r=\text{pipe}=(x>>4)+(y>>4) \bmod 3; \text{ where,}$$

$$M=[1\ 1;\ 0\ 1]; \text{ a 2×2 matrix;}$$

m=n=4, k=3, and l=1 of the subclass lattice equation described above.

The pipe resource mapping in FIG. 4B flows from the following equation:

$$r=\text{pipe}=((x>>2)+3*(y>>4) \bmod 6)>>1.$$

The following mc code "zb_cc_hash.mc" is an example of a device, such as a graphics processor, having mapping logic for mapping pixels to cache lines of direct mapped caches. The device can be switched between dyadic, lattice, and/or hybrid mapping.

```
module zb_cc_hash (
  x,
  y,
  reg_func_a,
  reg_func_b,
  reg_func_a_arg_x,
  reg_func_a_arg_y,
  reg_func_a_arg_xy1,
  reg_func_a_arg_xy2,
  reg_func_b_arg_x,
  reg_func_b_arg_y,
  reg_func_b_arg_xy1,
  reg_func_b_arg_xy2,
  reg_func_select,
```

```
        index
);
directive (delay = 1000);
input [11:0] x;
input [11:0] y;
input [1:0] reg_func_a; // func_a and func_b computations are parallel
alu logic
input [1:0] reg_func_b;
input [27:0] reg_func_a_arg_x; //every 4 bits of this selects a bit
from cat(1'b1, 1'bx, x[11:1], 1'b0)
input [27:0] reg_func_a_arg_y; //every 4 bits of this selects a bit
from cat(1'b1, 1'bx, y[11:1], 1'b0)
input [29:0] reg_func_a_arg_xy1; // arg_xy1 has SEL0..SEL5, each is 5-
bit select from x and y
input [4:0] reg_func_a_arg_xy2; // arg_xy2 has SEL6, a 5-bit select
from x and y
input [27:0] reg_func_b_arg_x;
input [27:0] reg_func_b_arg_y;
input [29:0] reg_func_b_arg_xy1;
input [4:0] reg_func_b_arg_xy2;
input [6:0] reg_func_select;
output [6:0] index;
integer i;
integer j;
// a_arg_x is a crossbar of x
wire [6:0] a_arg_x=cat(replicate(i=6; i>=0; i=i-1; ","){(unsigned
[0:0])(reg_func_a_arg_x [{i*4+3}:{i*4}]?
        1'b1: 1'bx: 1'bx: 1'bx:
        replicate(j=11; j>=1; j=j-1; ":"){x[{j}]}:1'b0)});
// a_arg_x is a crossbar of y
wire [6:0] a_arg_y=cat(replicate(i=6; i>=0; i=i-1; ","){(unsigned
[0:0]) (reg_func_a_arg_y[{i*4+3}:{i*4}]?
        1'b1: 1'bx: 1'bx: 1'bx:
        replicate(j=11; j>=1; j=j-1; ":"){y[{j}]}:1'b0)});
// a_arg_xy is a crossbar of x and y
wire [6:0] a_arg_xy=cat((unsigned [0:0])(reg_func_a_arg_xy2[4:0]?
        1'b1 :
// SEL6 5-bit value of 31
        replicate(j=30; j>=27; j=j-1; ":"){1'bx) :
// SEL6 5-bit value of 30–27
        replicate(j=11; j>=1; j=j-1; ":"){y[{j}]} :
// SEL6 5-bit value of 26–16
        replicate(j=15; j>=12; j=j-1; ":"){1'bx) :
// SEL6 5-bit value of 15–12
        replicate(j=11; j>=1; j=j-1; ":"){x[{j}]} :
// SEL6 5-bit value of 11–1
        1'b0),
// SEL6 5-bit value of 0
        replicate(i=5; i>=0; i=i-1; ",")
        {(unsigned
[0:0])(reg_func_a_arg_xy1[{i*5+4}:{i*5}] ?
        1'b1 :
// SELi 5-bit value of 31
        replicate(j=30; j>=27; j=j-1; ":"){1'bx} :
// SELi 5-bit value of 30–27
        replicate(j=11; j>=1; j=j-1; ":"){y[{j}]} :
// SELi 5-bit value of 26–16
        replicate(j=15; j>=12; j=j-1; ":"){1'bx} :
// SELi 5-bit value of 15–12
        replicate(j=11; j>=1; j=j-1; ":"){x[{j}]} :
// SELi 5-bit value of 11–1
        1'b0)});
// SELi 5-bit value of 0
// b_arg_x is a crossbar of x
wire [6:0] b_arg_x=cat(replicate(i=6; i>=0; i=i-1; ","){ (unsigned
[0:0])(reg_func_b_arg_x[{i*4+3}:{i*4}]?
        1'b1: 1'bx: 1'bx: 1'bx:
        replicate(j=11; j>=1; j=j-1; ":"){x[{j}]}:1'b0)});
// b_arg_y is a crossbar of y
wire [6:0] b_arg_y=cat(replicate(i=6; i>=0; i=i-1; ","){(unsigned
[0:0])(reg_func_b_arg_y[{i*4+3}:(i*4}]?
        1'b1: 1'bx: 1'bx: 1'bx:
        replicate(j=11; j>=1; j=j-1; ":"){y[{j}]}:1'b0)});
// b_arg_xy is a crossbar of x and y
wire [6:0] b_arg_xy=cat((unsigned [0:0])(reg_func_b_arg_xy2[4:0]?
        1'b1 :
// SEL6 5-bit value of 31
        replicate(j=30; j>=27; j=j-1; ":"){1'bx} :
// SEL6 5-bit value of 30–27
        replicate(j=11; j>=1; j=j-1; ":"){y[{j}]} :
```

```
// SEL6 5-bit value of 26–16
        replicate(j=15; j>=12; j=j−1; ":"){1'bx} :
// SEL6 5-bit value of 15–12
        replicate(j=11; j>=1; j=j−1; ":"){x[{j}]} :
// SEL6 5-bit value of 11–1
        1'b0),
// SEL6 5-bit value of 0
         replicate(i=5; i>=0; i=i−1; ",")
         {(unsigned
[0:0])(reg_func_b_arg_xy1[{i*5+4}:{i*5}] ?
        1'b1 :
// SELi 5-bit value of 31
        replicate(j=30; j>=27; j=j−1; ":"){1'bx} :
// SELi 5-bit value of 30–27
        replicate(j=11; j>=1; j=j−1; ":"){y[{j}]} :
// SELi 5-bit value of 26–16
        replicate(j=15; j>=12; j=j−1; ":"){1'bx} :
// SELi 5-bit value of 15–12
        replicate(j=11; j>=1; j=j−1; ":"){x[{j}]} :
// SELi 5-bit value of 11–1
        1'b0)});
// SELi 5-bit value of 0
// output of alu a computed based on reg_func_a
wire [6:0] a_result=reg_func_a?(unsigned [6:0])(a_arg_y−
a_arg_x+a_arg_xy): //3: Y − X + XY
        (unsigned [6:0])(a_arg_x−
a_arg_y+a_arg_xy): //2: X − Y + XY
        (unsigned
[6:0])(a_arg_x+a_arg_y+a_arg_xy): //1: X + Y + XY
        (a_arg_x ^ a_arg_y ^ a_arg_xy);
//0: X ^ Y ^ XY
// output of alu b computed base on reg_func_b
wire [6:0] b_result=reg_func_b?(unsigned [6:0])(b_arg_y−
b_arg_x+b_arg_xy): //3: Y − X + XY
        (unsigned [6:0])(b_arg_x−
b_arg_y+b_arg_xy): //2: X − Y + XY
        (unsigned
[6:0])(b_arg_x+b_arg_y+b_arg_xy): //1: X + Y + XY
        (b_arg_x ^ b_arg_y ^ b_arg_xy);
//0: X ^ Y ^ XY
// index is a crossbar of alu a and b output
index=cat(replicate(i=6;i>=0;i=i−
1;","){reg_func_select[{i}]?b_result[{i}]:a_result[{i}]});
endmodule
```

The following mc code "zb_adr_sel.mc" is an example of a device, such as a graphics processor, having mapping logic for mapping pixels to memory channels, memory banks and/or memory rows. The device has extensive lattice and hybrid mapping capabilities for channel/bank/row mapping.

```
module zb_adr_sel (
    x,
    y,
    reg_mem_base,
    reg_addr_select1,
    reg_addr_select2,
    reg_shift_x,
    reg_shift_y,
    reg_indA_cx,
    reg_indA_cy,
    reg_indA_offset,
    reg_indB_cx,
    reg_indB_cy,
    reg_indB_offset,
    reg_selAB,
    reg_shift_coordA,
    reg_shift_coordB,
    reg_coord_ca,
    reg_coord_cb,
    reg_coord_shift,
    mem_out
);
directive(delay=2300);
directive(clock="clk", pipeline="on", pipestall="stalln");
input [9:0]      x; // x_d4[11:2]
input [9:0]      y; // y_d4[11:2]
input [31:0]     reg_mem_base;       // 16k aligned surface base address
input [31:0]     reg_addr_select1;   // crossbar selects for memory address [13:6]
input [7:0]      reg_addr_select2;   // crossbar selects for memory address [15:14]
input [1:0]      reg_shift_x;        // shift x for surface
input [1:0]      reg_shift_y;        // shift y for surface
input [15:0]     reg_indA_cx;        // indexer A coefficient for x
input [15:0]     reg_indA_cy;        // indexer A coefficient for y
input [15:0]     reg_indA_offset;    // indexer A offset
input [15:0]     reg_indB_cx;        // indexer B coefficient for x
input [15:0]     reg_indB_cy;        // indexer B coefficient for y
input [15:0]     reg_indB_offset;    // indexer B offset
input [7:0]      reg_selAB;          // A/B indexer selector for index
input [2:0]      reg_shift_coordA;   // indexer A coordinate shifter
input [2:0]      reg_shift_coordB;   // indexer B coordinate shifter
input [15:0]     reg_coord_ca;       // indexer A coordinate coefficient
input [15:0]     reg_coord_cb;       // indexer B coordinate coefficient
input [3:0]      reg_coord_shift;    // coordinate shift
output [26:0]    mem_out;
integer i, j;
wire [8:0] x1 = x[9:0] >> reg_shift_x[1:0];
wire [8:0] y1 = y[9:0] >> reg_shift_y[1:0];
wire unsigned [15:0] indA = (x1[8:0] * reg_indA_cx[15:0]) + (y1[8:0] *
    reg_indA_cy[15:0]) + reg_indA_offset[15:0];
wire unsigned [15:0] indB = (x1[8:0] * reg_indB_cx[15:0]) + (y1[8:0] *
    reg_indB_cy[15:0]) + reg_indB_offset[15:0];
```

-continued

```
wire [7:0] ind = cat(reg_selAB[0] ? indA[7] indB[0],
            reg_selAB[1] ? indA[6] indB[1],
            reg_selAB[2] ? indA[5] : indB[2],
            reg_selAB[3] ? indA[4] : indB [3],
            reg_selAB[4] ? indA[3] : indB[4],
            reg_selAB[5] ? indA[2] : indB[5],
            reg_selAB[6] ? indA[1] : indB[6],
            reg_selAB[7] ? indA[0] : indB[7]);
// Generate mem_addr[15:5]
wire unsigned [10:0] mem_bottom = cat(replicate(i=1; i>=0; i=i−1; ",")
    {(unsigned [0:0])(reg_addr_select2[{i*4+3}:{i*4}] ?
        replicate(j=15; j>=8; j=j−1; ":"){ind[{j−8}]} : //
SEL[15..14] of value 15–8 for ind[7:0]
        replicate(j=7; j>=5; j=j−1; ":"){ x[{j−5}]} : //
SEL[15..14] of value 7–5 for x[2:0]
        replicate(j=4; j>=2; j=j−1; ":"){ y[{j−2}]} : //
SEL[15..14] of value 4–2 for y[2:0]
        1'b0 : 1'b0)                  //
SEL[15..14] of value 1–0 are zeros
    },
    replicate(i=7; i>=0; i=i−1; ",")
    {(unsigned [0:0])(reg_addr_select1[{i*4+3}:{i*4}] ?
        replicate(j=15; j>=8; j=j−1; ":"){ind[{j−8}]} : //
SEL[13..6] of value 15–8 for ind[7:0]
        replicate(j=7; j>=5; j=j−1; ":"){ x[{j−5}]} : //
SEL[13..6] of value 7–5 for x[2:0]
        replicate(j=4; j>=2; j=j−1; ":"){ y[{j−2}]} : //
SEL[13..6] of value 4–2 for y[2:0]
        1'b0 : 1'b0)                  //
SEL[13..6] of value 1–0 are zeros
    },
    1'b0); // mem_out[5] is zero for 4×4 tile
wire unsigned [8:0] cA = (unsigned [8:0])(indA[15:0] >>
reg_shift_coordA[2:0]);
wire unsigned [8:0] cB = (unsigned [8:0])(indB[15:0] >>
reg_shift_coordB[2:0]);
// products of multiplies are added with LSB aligned to LSB of mem_base
wire unsigned [31:0] mem_top_32 = (cA[8:0] * reg_coord_ca[15:0]) +
(cB[8:0] * reg_coord_cb[15:0]) +
            reg_mem_base[31:0];
wire unsigned [15:0] mem_top = mem_top_32[31:0] >>
reg_coord_shift[3:0];
// Generate mem_addr[31:5]
wire unsigned [26:0] mem_tile_addr = cat(mem_top, mem_bottom);
mem_out = mem_tile_addr; // mem_addr[31:5]
endmodule
```

Embodiments described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing embodiments include: microcontrollers with memory (such as electronically erasable programmable read only memory (EEPROM)), embedded microprocessors, firmware, software, etc. Furthermore, embodiments may be implemented in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments is not intended to be exhaustive or limited by the disclosure. While specific embodiments of, and examples are described herein for illustrative purposes, various equivalent modifications are possible, as those skilled in the relevant art will recognize. The teachings provided herein can be applied to other systems and methods, and not only for the systems and methods described above. The elements and acts of the various embodiments described above can be combined to provide further embodiments. These and other changes can be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. For example, while only one aspect is recited as embodied in machine-readable medium, other aspects may likewise be embodied in machine-readable medium. Accordingly, the inventors reserve the right to add additional claims after filing the application to pursue such additional claim forms for other aspects as well.

What is claimed is:

1. A computer-implemented method of mapping information to a number of resource items in a computer system, the method comprising:
   defining a first vector in a coordinate space;
   defining a second vector in the coordinate space;
   defining a lattice as a combination of the first and second vectors;
   defining a set of points including a reference point in the coordinate space;
   tiling the coordinate space with translations of the set of points;
   mapping the translations of the set of points to a resource item, wherein a resource item comprises hardware and software for a graphics data rendering process, comprising processing pipelines, cache lines, and memory channels; and
   defining a lattice mapping subclass, where a resource item (r) is mapped to a coordinate space, including:
   $r = (x' \bmod k) * 1 + (y' \bmod 1)$, where $(k*1)$ is the number of resource items;
   $x' = M*(x/2^n)$, M = a 2×2 matrix, n is an integer; and
   $y' = M*(y/2^m)$, m is an integer.

2. The method of claim 1, further comprising mapping pixels to a number of resource items in a graphics processing system.

3. The method of claim 1, further comprising forming a translated lattice with the first and second vectors for each resource item.

4. The method of claim 1, further comprising mapping pixels to a number of pixel processing pipes in a graphics processing system.

5. The method of claim 1, further comprising mapping pixels to a cache line of a cache in a graphics processing system.

6. The method of claim 1, further comprising mapping pixels to memory channels and memory banks in a graphics processing system.

7. A computer-implemented method of mapping information to a number of resource items in a computer system, wherein the information comprises pixel data for graphics processing, the method comprising:
    combining the number of resource items into sets having a number of elements of powers of n;
    mapping a set of resource items to a lattice in a coordinate space where the set of resource items is used to process a translated tile, wherein a resource item comprises hardware and software for a graphics data rendering process, comprising processing pipelines, cache lines, and memory channels;
    tiling the coordinate space with the translated tile;
    defining a lattice mapping subclass, where a resource item is mapped to a coordinate space; and
    mapping the set of resource items to aspects of the translated tile using a dyadic.

8. The method of claim 7, further comprising mapping different resource items to a corresponding lattice.

9. The method of claim 7, further comprising mapping pixels to a set of resource items in a graphics processing system.

10. The method of claim 7, further comprising using different first and second vectors in the coordinate space for each set of resource items.

11. The method of claim 7, further comprising mapping pixels to a number of pixel processing pipes in a graphics processing system.

12. The method of claim 7, further comprising mapping pixels to a cache line of a cache in a graphics processing system.

13. The method of claim 7, further comprising mapping pixels to memory channels and memory banks in a graphics processing system.

14. A non-transitory computer-readable medium having stored thereon instructions which, when executed, map information to a number of resource items in a computer system, wherein the information comprises pixel data for graphics processing, including:
    defining a first vector in a coordinate space;
    defining a second vector in the coordinate space;
    defining a lattice as a combination of the first and second vectors;
    defining a set of points including a reference point in the coordinate space;
    tiling the coordinate space with translations of the set of points;
    defining a lattice mapping subclass, where a resource item is mapped to a coordinate space; and
    mapping the translations of the set of points to a resource item, wherein a resource item comprises hardware and software for a graphics data rendering process, comprising processing pipelines, cache lines, and memory channels.

15. The computer-readable medium of claim 14, further comprising mapping a resource item using a dyadic permutation.

16. The computer-readable medium of claim 14, further comprising mapping pixels to a set of resource items in a graphics processing system.

17. The computer-readable medium of claim 14, further comprising mapping pixels to a number of pixel processing pipes in a graphics processing system.

18. The computer-readable medium of claim 14, further comprising mapping pixels to a cache line of a cache in a graphics processing system.

19. The computer-readable medium of claim 14, further comprising mapping pixels to memory channels and memory banks in a graphics processing system.

20. A method of mapping information to a number of resource items in a graphics processing system, the method comprising:
    the graphics processing system defining a first vector in a coordinate space;
    the graphics processing system defining a second vector in the coordinate space;
    the graphics processing system defining a lattice as a combination of the first and second vectors;
    the graphics processing system defining a lattice mapping subclass, where a resource item (r) is mapped to a coordinate space, including,
    $r=(x' \bmod k)*1+(y' \bmod 1)$, where (k*1) is the number of resource items;
    $x'=M*(x/2^n)$, M=a 2×2 matrix, n is an integer; and
    $y'=M*(y/2^m)$, m is an integer;
    the graphics processing system defining a set of points including a reference point in the coordinate space;
    the graphics processing system tiling the coordinate space with translations of the set of points; and
    the graphics processing system mapping the translations of the set of points to a resource item.

21. The method of claim 20, further comprising the graphics processing system mapping pixels to a number of resource items in a graphics processing system.

22. The method of claim 20, further comprising the graphics processing system forming a translated lattice with the first and second vectors for each resource item.

23. The method of claim 20, further comprising the graphics processing system mapping pixels to a number of pixel processing pipelines in the graphics processing system.

24. The method of claim 20, further comprising the graphics processing system mapping pixels to a cache line of a cache in the graphics processing system.

25. The method of claim 20, further comprising the graphics processing system mapping pixels to memory channels and memory banks in the graphics processing system.

* * * * *